United States Patent [19]

Mallory et al.

[11] 4,120,684
[45] Oct. 17, 1978

[54] MOLD RING TRANSFER APPARATUS

[75] Inventors: James D. Mallory, Maumee; John F. Fleck, Reynoldsburg; Mario Cuniberti, Columbus, all of Ohio

[73] Assignee: Owens-Illinois, Inc., Toledo, Ohio

[21] Appl. No.: 801,687

[22] Filed: May 31, 1977

[51] Int. Cl.² .............................................. C03B 19/04
[52] U.S. Cl. ....................................... 65/302; 65/241; 65/260; 65/307; 65/357
[58] Field of Search .................... 65/260, 71, 307, 241, 65/302, 357, 70

[56] References Cited

U.S. PATENT DOCUMENTS 3,597,181  8/1971  Prendergast .............................. 65/71

Primary Examiner—Arthur D. Kellogg
Attorney, Agent, or Firm—M. E. Click; D. H. Wilson; S. M. McLary

[57] ABSTRACT

An improved apparatus for the transfer of mold rings in a centrifugal casting process. One type of forming process for the funnel portions of color television picture tube envelopes utilizes a centrifugal casting process for the glass. This process requires a main mold body. An indexing mechanism moves from a station at which the mold ring is deposited on the main mold to a station where the mold ring is removed from the main mold after completion of the casting process. A movable shuttle member is connected to pivotally mounted pairs of support fingers for the mold rings through connecting rods. An external drive motor operates a single actuator at each machine cycle. This single actuator causes the entire shuttle to shift and a mold ring to be deposited at one station and a second mold ring to be simultaneously picked up at another station. Because of the mechanical linkage design, one pair of support fingers always opens while all the others close when the single actuator is operated.

4 Claims, 9 Drawing Figures

MOLD RING TRANSFER APPARATUS

BACKGROUND OF THE INVENTION

This invention generally relates to the manufacture of glass components for television picture tubes. More particularly, this invention relates to the manufacture of the glass funnel portion of a television picture tube by a centrifugal casting process. Yet more particularly, this invention relates to a transfer mechanism for mold rings for this centrifugal casting process. Specifically, this invention relates to an improved operating mechanism for the transfer mechanism in such a process.

The manufacture of glass parts for television picture tubes, in particular funnels, by a centrifugal casting process is well known in the art. See, for example, U.S. Pat. Nos. 3,132,018 and 3,589,882. One requirement of such a process is the transfer and orientation of a mold ring for the main mold. Devices to carry out this aspect of the process are also known in the art. See, for example, U.S. Pat. Nos. 3,597,181 and 3,708,274. The mechanism shown in U.S. Pat. No. 3,597,181 has been particularly successful in commercial operations. However, its arm opening mechanism and carrying arms themselves have been subject to relatively high maintenance requirements. We have devised an improved mechanism for that machine which incorporates substantially improved carrying arms and actuation mechanisms for them.

SUMMARY OF THE INVENTION

Our invention resides in an apparatus for orienting and transferring a mold ring of a centrifugal mold for casting a hollow glass article such as a television tube funnel of a generally frusto-pyramidal configuration. This apparatus is operated in an indexing mode between discrete stations, one of the stations requiring release of the mold ring to the centrifugal mold and another of the stations requiring removal of the mold ring from the centrifugal mold. We have devised an improvement for such an apparatus which includes a drive shaft driven in the indexing mode previously mentioned. A support member housing is attached to the drive shaft for rotation therewith. The support member has a plurality of cut-out portions formed in its periphery, with the number of said cut-out portions being equal to the number of discrete stations. A hollow, arcuate support finger holder is attached to each of the cut-out portions. A pair of support fingers are movably attached to each support finger holder. These pairs of support fingers are movable as units from a retracted position within the hollow support finger holders to a position beyond the support finger holders at least partially extending into the center of the arcuate support finger holder. By this means, a mold ring will be held when the support fingers are extended and released when they are retracted. Mechanical linkage means carried by the support member housing interconnects all of the pairs of support fingers to allow retraction of one pair of support fingers and simultaneous extention of all the rest of the pairs of support fingers when the linkage means is actuated. A means for actuating the mechanical linkage means in synchronism with the cycle of the apparatus is provided.

BRIEF DESCRIPTION OF THE DRAWINGS

FIG. 2 is a bottom plan view of the apparatus of the present invention;

FIG. 3 is a cross-sectional view taken along the line 3—3 of FIG. 2;

DETAILED DESCRIPTION OF THE DRAWINGS

Figure 1:
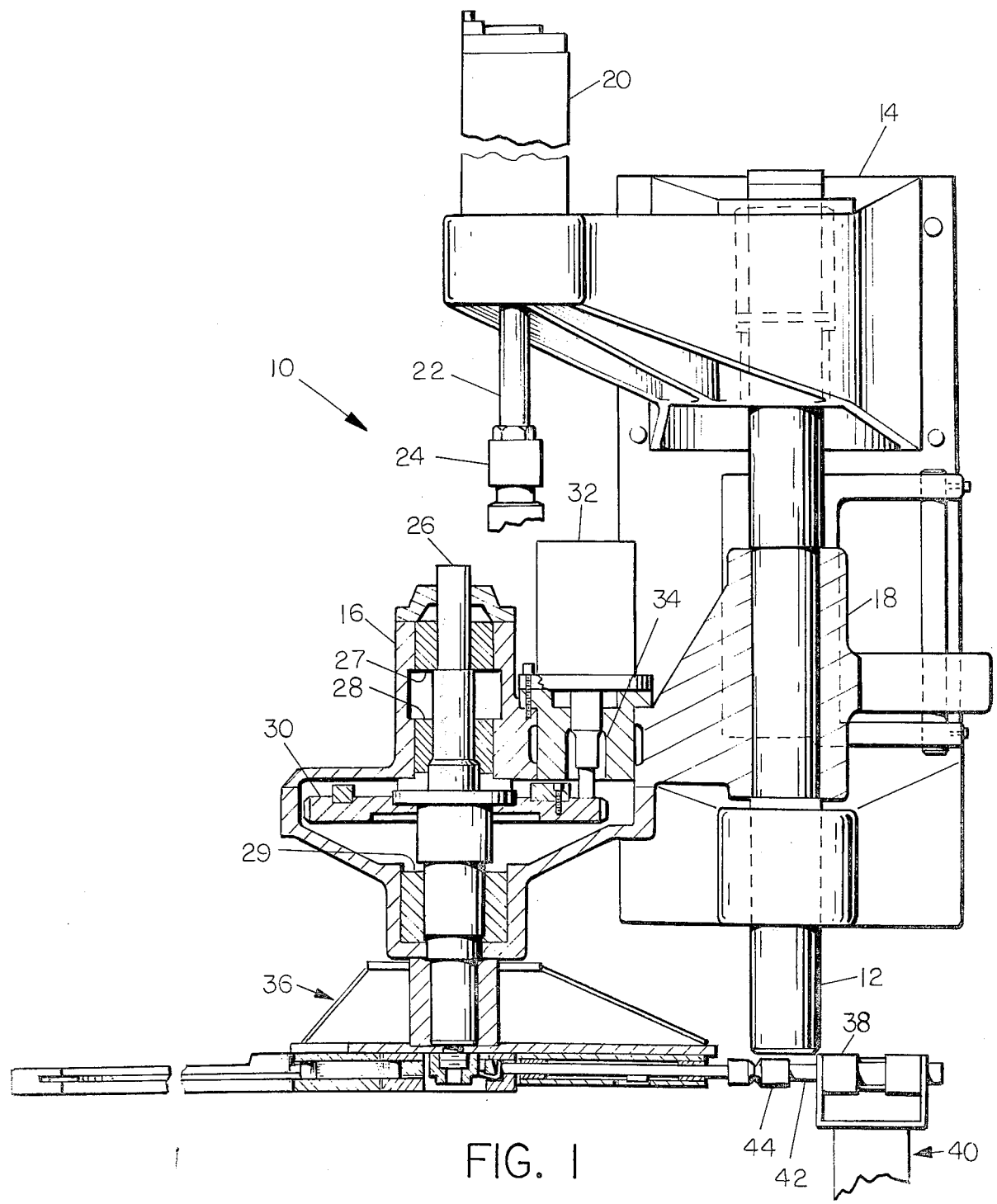
FIG. 1 is a side elevation view, partially in cross-section, of the present invention.

FIG. 1 illustrates generally the configuration of a total ring transfer mechanism 10 with some parts omitted in the interest of simplicity. The transfer mechanism 10 is used, as has been previously explained, in a glass forming process for the manufacture of components for television picture tubes using a centrifugal casting technique. The entire unit is supported from the floor on a main support casting 14. A post 12 is attached to the support casting 14 at both the lower and upper end of the support casting 14. A drive housing unit 16 is extended from the post 12 in a cantilevered fashion and includes a boss 18 which is vertically slidable with respect to the post 12. Suspended from casting 14 is a drive motor 20 which is preferably of the fluid type having an extensible operating rod 22. Attached to the operating rod 22 is an attachment member 24, shown broken away in FIG. 1, which is firmly attached to the drive housing 16. Thus extension and retraction of the operating rod 22 will cause the drive housing 16 to be moved up and down relative to the post 12. This function is necessary in order to allow deposit and removal of the forming rings at the various stations. A drive shaft 26 is rotatably mounted within the drive housing 16 in bearing members such as those illustrated at 27, 28 and 29. The drive shaft 26 is thus free to rotate with respect to the drive housing 16. Pinned to the drive shaft 26 is a spur gear 30. An indexing drive 32 is carried by the drive housing 16. The indexing drive 32 may be any type of driving motor which can be actuated in response to the receipt of signals to index from one discrete position to another. The indexing drive 32 drives a shaft 34 which has attached to its end a spur gear, not visible in FIG. 1, which is in mesh with the spur gear 30. The net result is that as the indexing drive 32 is driven, its spur gear will drive the spur gear 30 and therefore rotate the drive shaft 26. This is preferably done in a discrete fashion so that the drive shaft 26 is stopped at predictable intervals at a series of stations. This form of drive is well known in the art and needs no further explanation. As was noted, the drive shaft 26 rotates with respect to the drive housing 16. Thus the drive housing 16 remains stationary during normal operational conditions. However, attached to the lower portion of the drive shaft 26 is a support member housing 36 which rotates with the drive shaft 26. As will be shown in greater detail in the following drawing figures, the support member housing 36 contains the elements which support the rings for the centrifugal casting operation, and is indexed from station to station by the intermittent indexing type motion imparted to the drive shaft 26. Also seen in FIG. 1 is a fluid operating motor 38 which is supported from a stationary bracket member 40. The fluid motor 38 is of the type which has an extensible operating rod 42. On its extending end, the operating rod 42 has attached to it a tip portion 44.

Figure 4:
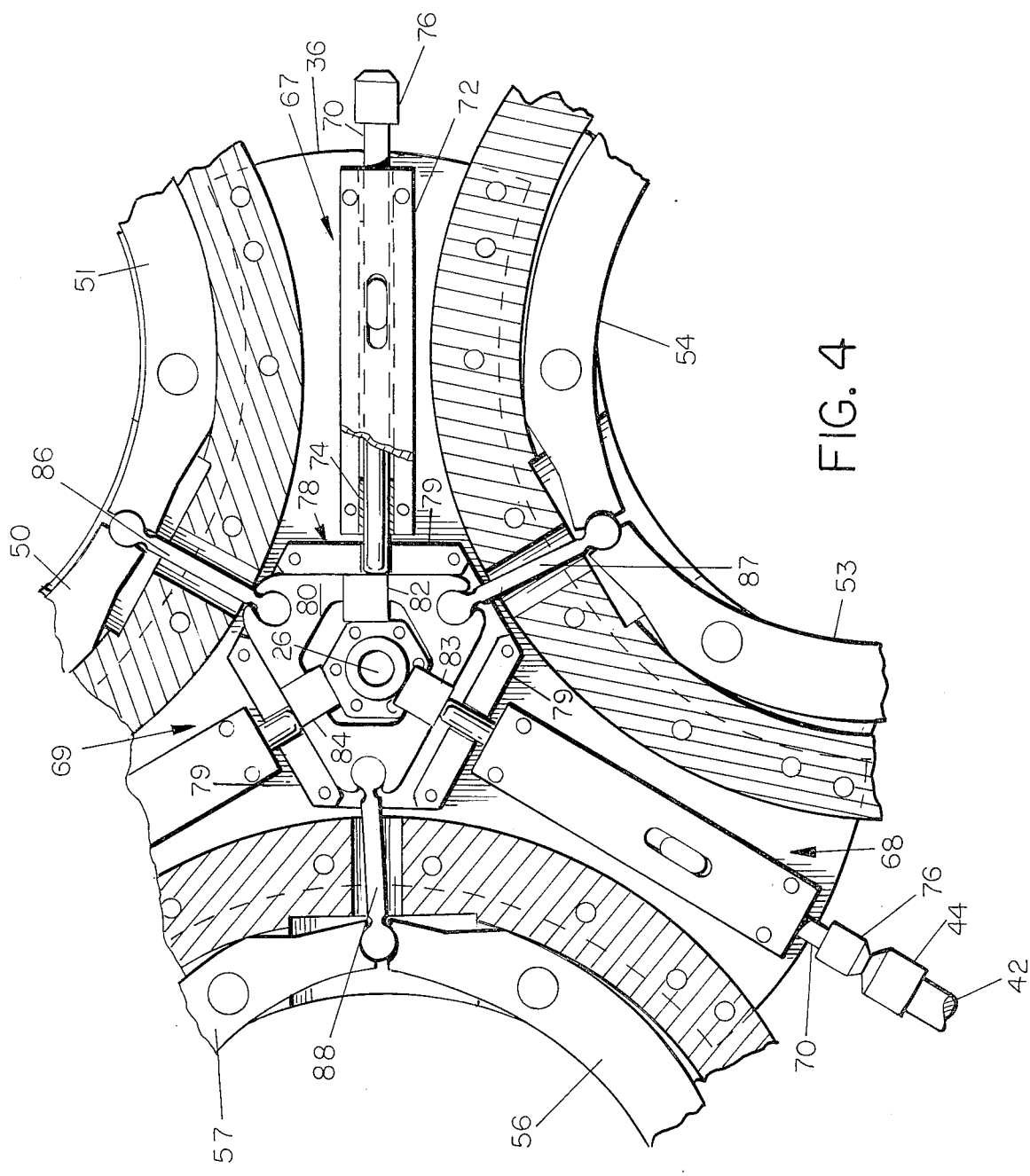
FIG. 4 is a partial view similar to FIG. 2, on an enlarged scale, with some cover members removed.

As has been stated, the basic purpose of this invention is to allow handling of removable mold rings in a centrifugal casting process. The basic shape of these rings may be seen with reference to U.S. Pat. No. 3,597,181, the teachings of which are hereby incorporated by reference. FIG. 2 is a bottom view of the apparatus as illustrated in FIG. 1. Particularly, FIG. 2 is a bottom view on an enlarged scale of the support member housing 36. It may be seen in FIG. 2 that the bottom plate portion of support member housing 36 is generally divided into three, equally spaced, cut-out portions. These cut-out portions are shown as being generally arcuate in nature and will be described as such herein. However, if space would permit, the bottom plate could be a complete disc and the cut-out portions could be circular openings formed therein. Attached to each of these arcuate cut-out areas are arcuate support finger holders 46, 47 and 48. The support finger holders 46 through 48 are firmly attached to the support member housing and move as a unit with it. In addition, these support finger holders are hollow inside and have contained within them support fingers, respectively 50 and 51, 53, 54 and 56, 57. The support fingers are designed to hold the mold ring units which this invention transports from station to station. In this particular case, three pairs of support fingers are shown since the machine with which this is designed to operate has three basic operational stations. However, it would be possible to have more than three stations if such were desired. There would be, of course, still only one station at which the mold rings would be deposited on the centrifugal casting mold and in all likelihood only a single station at which such molds would be picked up. Thus in the operational description which will follow, it should be kept in mind that whatever the operational mode might be, only one of the sets of fingers would be retracted at any one time. Observe that in FIG. 2 two pairs of the support fingers, 53, 54 and 56, 57, are extended outwardly from their respective support finger holders 47 and 48. In this extended position, a flange of the mold ring would be grasped and the mold ring would be held and transported by these support fingers. Likewise, the support fingers 50 and 51 are retracted within the interior of their support finger holder 46. In this case, the mold ring which had been carried by these fingers would be deposited in the location where this retraction took place. This would, of course, be over the centrifugal casting mold. It is evident that the support finger pairs are mounted within the support finger holder for in and out movement. This mounting could be for a sliding type of motion, but in this particular case, the mounting is of a pivotal type. The support fingers 50, 51, 53, 54, 56 and 57 are supported respectively on pivot pins 60 through 65. As best seen in FIG. 3, the support fingers, in this case the support finger 51, are free to move upon their pivot pins, in this case 61. In addition, FIG. 3 also shows the recess portion within the support finger holder 46 into which the support finger 51 fits. The support fingers are opened and closed in response to the actuation of the operating rod 42 of the fluid motor 38. As can be seen in FIG. 2, there are provided a number of actuating means 67 through 69 which are equal in number to the number of pairs of fingers. The actuation means are used to open and close the various pairs of support fingers at the appropriate point in this machine operating cycle. Reference should now be had to FIG. 4 for further details of the actual operating mechanism.

In FIG. 4, the view of FIG. 2 is shown in a partial view on an enlarged scale and further with numerous cover portions removed in order to more clearly show the precise mode of operation. All of the actuation means are identical in construction, and the actuation means 67 is shown partially cut away in FIG. 4 to illustrate this construction. A rod member 70 is freely and slidably mounted within a tubular shield or housing 72. Linear type bearing surfaces such as that shown at 74 may be provided to allow smooth movement of the rod member 70 within the tubular housing 72. At the end of the rod member 70 which is remote from the shaft 26, is attached a tip member 76. Contained within a first or upper cage element 78 attached to the bottom of the support member housing 36 is a movable triangular shuttle 80. It may be seen that the cage member 78 includes openings through which the rod members 70 from the actuation means extend and upstanding sidewalls 79. In actual operation, the cage member 78 and the shuttle 80 are covered by a second cage member which has been removed in FIG. 7. The ends of the rod members 70 bear on "L" shaped drive blocks 82 through 84 which are carried by the shuttle 80. The shuttle 80 and a typical block 82 may be seen in more detail with respect to FIGS. 5 and 6 and will be described in more detail with respect to these figures. The connection between the shuttle 80 and the various support fingers is completed through generally dumbbell shaped connecting rods 86 through 88 which tie the shuttle 80 to support fingers 50 and 51, 53 and 54, and 56 and 57. A typical connecting rod 86 is shown more specifically in FIG. 7. It should be clear from viewing FIG. 4 that the connection of any one of the connecting rods from the shuttle to a pair of support fingers is basically a ball joint type of connection. Consequently, movement of the shuttle 80 will be transmitted to the support finger pairs and cause these pairs to open or close depending upon the direction of motion of the shuttle and the connecting rod responsible for operating any pair of support fingers. In FIG. 4, the situation shown is one in which the operating rod 42 of the fluid motor 38 has been extended such that its tip portion 44 has contacted the tip portion 76 of the actuation means 68. When this occurs, the rod member 70 of the actuation means 68 is pushed forward against the block 83. This in turn, as will be explained in more detail with respect to FIGS. 8 and 9, causes the shuttle 80 to move and push the connecting rod 86 away from the shaft 26. This movement of the connecting rod 86 causes its support fingers 50 and 51 to retract into the support finger holder 46. In this case then, any ring mold held by the support fingers 50 and 51 will be released. Conversely, the same motion will cause the connecting rods 87 and 88 to be moved in toward the shaft 26. This movement then causes the support fingers 53, 54 and 56 and 57 to pivot about their pivot pins and move outwardly or open to grasp any ring mold member which is in position to be picked up by this movement. It may thus be appreciated that at the next rotational cycle, assuming, for example, a clockwise indexing movement, the actuation means 67 would be brought into registry with the tip portion 44 of the operating rod 42. In this case then, the actuation means 67 would be operated so that its rod 70 would be pressed inwardly toward the shaft 26. After this index has taken place it should be realized that the support fingers 56 and 57 would occupy the position held by the support fingers 50 and 51 in FIG. 4. The result would then be that the support fingers 56 and 57 would be opened while the support fingers 50 and 51 and 53 and 54 would be either closed or would remain closed. Thus at only one position in the cycle will the support fingers be opened to allow deposit of a ring mold carried by them. It should be realized that the mechanism shown in FIG. 4 is a self resetting sort of mechansim so that even though the shuttle has been moved to one position, at the next index cycle the actuation of the next actuation means will result in the shuttle 80 still functioning in the proper manner.

Figure 6:
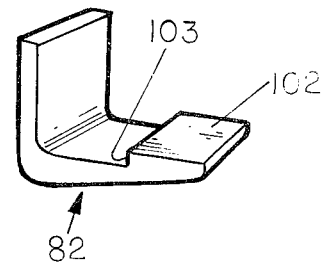
FIG. 6 is a perspective view of one of the drive blocks of the present invention.
Figure 7:
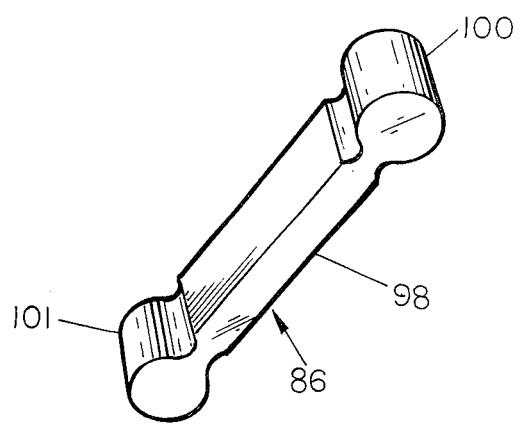
FIG. 7 is a perspective view of one of the connecting rods of the present invention.
Figure 5:
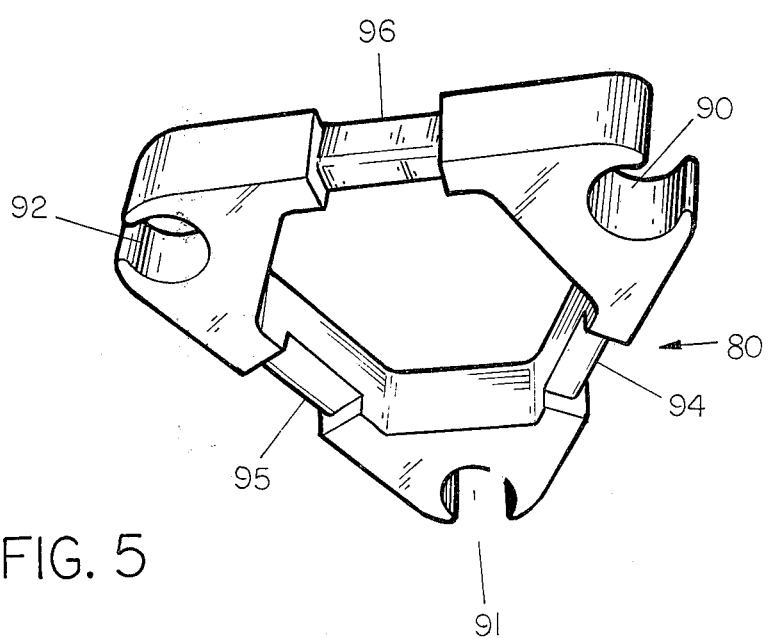
FIG. 5 is a perspective view of the shuttle member of the present invention.

FIG. 5 shows an enlarged perspective view of the shuttle 80 completely removed from its operational environment. Note that the shuttle 80 is, as previously noted, generally triangular in shape and contains at its apexes three arcuate seats 90 through 92 for receiving the connecting rods. The shuttle 80 also includes three cut out portions 94 through 96 in which the blocks 82 through 84 are located. The cut outs 94 through 96 are positioned along the sides of the triangularly shaped shuttle 80 generally centrally of the three sides. As will be seen more clearly with respect to FIGS. 8 and 9, the cut outs 94 through 96 are inclined at their back edges toward the central shaft 26. The connecting rods, such as 86 shown in FIG. 7, are all basically identical and are generally of a dumb bell type shape. That is, the connecting rod 86, which is typical of all the connecting rods, includes a long generally straight central body portion 98 which terminates at either end in cylindrical end pieces 100 and 101. As was previously noted, the general form of connection between the shuttle 80 and any pair of support fingers is of the nature of a ball and socket connection. It may therefore be seen that this description is generally accurate, although the end pieces 100 and 101 of the connecting rods are more a cylindrical shape than a true ball shape. The block 82 shown in FIG. 6 is typical of all of the blocks 82 through 84. It includes a tip portion 102 which is separated from the back body portion of the block 82 by a step 103.

Figure 9:
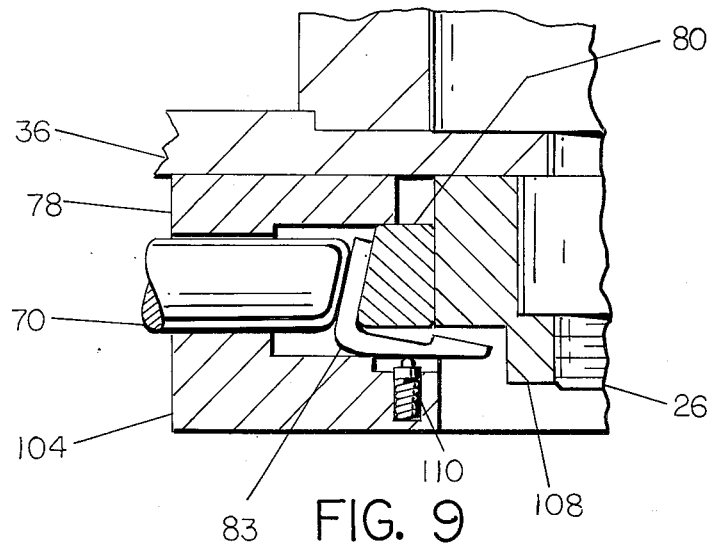
FIG. 9 is a side elevation view, partially in cross-section, showing the drive of the shuttle through a drive block.
Figure 8:
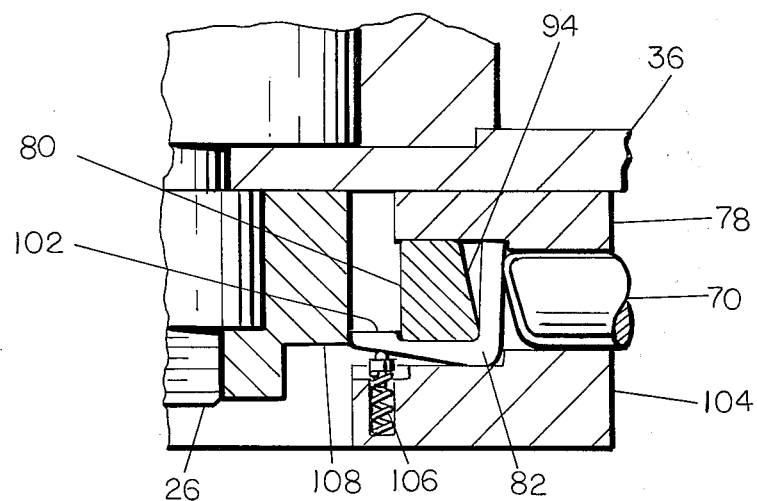
FIG. 8 is a side elevation view, partially in cross-section showing the locking of a drive block to the shuttle.

FIGS. 8 and 9 are used to illustrate the functioning of the blocks 82 through 84 in conjunction with the shuttle 80 and the various actuating means 67 through 69 to effect the opening and closing of the support finger pairs. FIG. 8 illustrates the configuration which is the normal situation with respect to the blocks and the shuttle. In FIG. 8, it may be seen that in addition to the first cage member 78 previously described there is also a second or lower cage member 104 provided which thus traps the shuttle 80 as was previously explained. A drive block, in this case chosen to be the block 82, is seated in its cut out portion 94 of the shuttle 80. The lower cage member 104 includes a spring 106 which bears against the tip portion 102 of the L block 82 and forces the step 103 above the edge of the cut out portion 94 of the shuttle 80, thus locking the block 82 into position. The rod member 70 from the actuation means 67 is seen as being in contact with the back face of the block 82. In this configuration, movement of the shuttle 80 will likewise impart movement to the rod member 70 of the actuation means 67 since the spring load holds the tip portion 102 locked against a spacer 108 attached to the shaft 26 and prevents the shuttle 80 from moving into the gap defined by the distance between the tip portion 102 and the face of the shuttle 80. In FIG. 9, however, the situation is illustrated wherein the rod member 70 of the actuation means 68, with reference to FIG. 4, has been activated through the fluid motor 38 and has pushed upon the block 83. This force overcomes the spring bias presented by yet another spring 110 in the lower cage member 104 and allows the shuttle 80 to be moved toward the spacer 108. This is precisely the action which has occurred in FIG. 4 and which has been described with respect to FIG. 4. Note that when the index of the mechanism occurs, the block 83 will spring back into the lock position as illustrated by the block 82 in FIG. 8 by virtue of being pushed by the next drive block in line being activated through its actuation means and the mechanism of the fluid motor 38. The spring member 110 will provide the force to once again lock the step 103 behind the shuttle member 80.

What we claim is:

1. In an apparatus for orienting and transferring a mold ring of a centrifugal mold for casting a hollow glass article such as a television tube funnel of a generally frusto-pyramidal configuration, wherein said apparatus is operated in an indexing mode between discrete stations, one of said stations requiring release of said mold ring to said centrifugal mold and another of said stations requiring removal of said mold ring from said centrifugal mold, the improvement which comprises:

a drive shaft driven in said indexing mode;

a support member housing attached to said drive shaft for rotation therewith, said support member having a plurality of cut out portions formed in its periphery, the number of said cut out portions being equal to the number of discrete stations;

a hollow, arcuate support finger holder attached to each of said cut out portions;

a pair of support fingers movably attached to each of said support finger holders and movable as a unit from a retracted position within said hollow support finger holders to a position beyond said support finger holder at least partially extending into the center of said arcuate support finger holder, whereby a mold ring is held when said support fingers are extended and released when said support fingers are retracted;

mechanical linkage means, carried by said support member housing, for interconnecting all of said pairs of support fingers to allow retraction of one pair of said support fingers and simultaneous extension of all of the rest of said pairs of support fingers when said mechanical linkage means is actuated, said mechanical linkage means including:

(a) an upper cage member attached to said support member housing, said upper cage member including upstanding sidewalls;

(b) a lower cage member attached to said upper cage member, thereby defining an open space between said upper and lower cage members;

(c) a shuttle positioned in said open space between said upper and lower cage members and movable within said open space;

(d) a plurality of connecting rods, equal in number to the number of said pairs of support fingers, connecting each pair of said support fingers to said shuttle; and (e) means for driving said shuttle, to open and close said support fingers, in response to said means for actuating said mechanical linkage; and means for actuating said mechanical linkage means in synchronism with the cycle of said apparatus.

2. The apparatus of claim 1 wherein said shuttle is further defined by cut out portions that are generally equally spaced about its periphery and wherein said means for driving said shuttle includes:

a generally "L" shaped drive block positioned in each of said cut out portions, said drive blocks having a step portion adjacent to a tip portion; and spring means, carried by said lower cage member, engaged with said drive blocks for biasing said drive blocks to lock said step portion into said cut out portion.

3. The apparatus of claim 2 wherein said means for actuating said mechanical linkage includes:

a drive motor operated in synchronism with the cycle of said apparatus; and actuating means, carried by said support member having housing, engagable with said drive blocks for overcoming the bias of said spring means to drive said shuttle when operated by said drive motor.

4. The apparatus of claim 3 wherein said actuating means includes:

a plurality of generally tubular housings, one for each of said drive blocks; and rod members freely slidable within said housings, one end of said rod members normally being in contact with its associated drive block and the other end thereof being free to be engaged by said drive motor, said drive motor engaging only one of said rod members at any one time.

* * * * *